(12) United States Patent
Kosowsky

(10) Patent No.: US 11,105,897 B2
(45) Date of Patent: Aug. 31, 2021

(54) IMAGING SYSTEM FOR LOCATING HUMAN BEINGS THROUGH BARRIERS

(71) Applicant: L.H. KOSOWSKY & ASSOCIATES, INC., Stamford, CT (US)

(72) Inventor: Lester H. Kosowsky, Stamford, CT (US)

(73) Assignee: L.H. KOSOWSKY & ASSOCIATES, Stamford, CT (US)

( * ) Notice: Subject to any disclaimer, the term of this patent is extended or adjusted under 35 U.S.C. 154(b) by 337 days.

(21) Appl. No.: 16/075,862

(22) PCT Filed: Feb. 17, 2017

(86) PCT No.: PCT/US2017/018441
§ 371 (c)(1),
(2) Date: Aug. 6, 2018

(87) PCT Pub. No.: WO2017/143234
PCT Pub. Date: Aug. 24, 2017

(65) Prior Publication Data
US 2020/0379102 A1    Dec. 3, 2020

Related U.S. Application Data

(60) Provisional application No. 62/296,722, filed on Feb. 18, 2016.

(51) Int. Cl.
*G01S 7/41*    (2006.01)
*G01S 13/88*   (2006.01)
*G01S 13/89*   (2006.01)

(52) U.S. Cl.
CPC ............ *G01S 7/412* (2013.01); *G01S 13/888* (2013.01); *G01S 13/89* (2013.01); *G01S 7/417* (2013.01)

(58) Field of Classification Search
CPC ........ G01S 13/888; G01S 7/412; G01S 13/89; G01S 7/417
(Continued)

(56) References Cited

U.S. PATENT DOCUMENTS 5,592,170 A * 1/1997 Price .................. F41H 11/16
                                                342/22
6,999,024 B2 * 2/2006 Kumon ................. G01S 7/41
                                                342/70
(Continued)

FOREIGN PATENT DOCUMENTS

CN    103177451 A  *  6/2013    ............ G06T 7/00
CN    104112270 A  * 10/2014    ............ G06T 7/00
(Continued)

*Primary Examiner* — Bernarr E Gregory
*Assistant Examiner* — Alexander L. Syrkin
(74) *Attorney, Agent, or Firm* — Tarolli, Sundheim, Covell & Tummino LLP

(57) ABSTRACT

Systems and methods are provided for recognizing a human being behind a barrier using a radar image. A millimeter band radar assembly captures radar returns from a region of interest, at least a portion of which is separated from the millimeter band radar assembly by the barrier. A system control processes the radar returns to provide at least one radar image showing the amplitude of the radar return in each of a plurality of locations within the region of interest. The system control includes a sensitivity tuning component that adjusts a noise floor for the processed sensor data to provide an image of the at least one radar image tuned to maximize the visibility of the human being. A display provides the radar image to a user.

16 Claims, 3 Drawing Sheets

(58) Field of Classification Search
USPC .......................................................... 342/22
See application file for complete search history.

(56) References Cited

U.S. PATENT DOCUMENTS

| | | | | |
|---|---|---|---|---|
| 8,891,711 | B1* | 11/2014 | Whitehead | H03H 17/02 |
| | | | | 375/350 |
| 9,075,129 | B2* | 7/2015 | Nguyen | G01S 13/9017 |
| 9,229,102 | B1* | 1/2016 | Wright | G01S 13/887 |
| 9,442,189 | B2* | 9/2016 | Wang | A61B 5/11 |
| 9,998,692 | B1* | 6/2018 | Griffiths | H04N 5/232 |
| 2003/0189511 | A1* | 10/2003 | Lasky | G01V 3/12 |
| | | | | 342/22 |
| 2004/0183712 | A1* | 9/2004 | Levitan | F41H 13/00 |
| | | | | 342/22 |
| 2008/0304044 | A1* | 12/2008 | Cooper | G01S 13/89 |
| | | | | 356/5.15 |
| 2010/0265117 | A1* | 10/2010 | Weiss | G01S 13/003 |
| | | | | 342/22 |
| 2015/0153449 | A1* | 6/2015 | Kosowsky | G01S 13/89 |
| | | | | 342/385 |
| 2015/0241555 | A1 | 8/2015 | Lin et al. | |
| 2016/0148078 | A1* | 5/2016 | Shen | G06K 9/66 |
| | | | | 382/158 |

FOREIGN PATENT DOCUMENTS

| | | | | |
|---|---|---|---|---|
| EP | 0660135 | A2 | 7/1996 | |
| JP | 2018119936 | A * | 8/2018 | G01S 7/32 |
| WO | 20070122408 | A1 | 11/2007 | |

* cited by examiner

IMAGING SYSTEM FOR LOCATING HUMAN BEINGS THROUGH BARRIERS

CROSS-REFERENCE TO RELATED APPLICATIONS

This application is a U.S. National Stage Application filed under 35 U.S.C. § 371 of PCT/US2017/018441, filed Feb. 17, 2017, and entitled IMAGING SYSTEM FOR LOCATING HUMAN BEINGS THROUGH BARRIERS, which claims the benefit of the U.S. Provisional Patent Application No. 62/296,722, filed on Feb. 18, 2016. The entire contents of each of the above-identified patent applications are incorporated herein by reference.

TECHNICAL FIELD

This invention relates to imaging systems, and more particularly, to an imaging system for obscured environments.

BACKGROUND

Individuals in emergency conditions must deal with a number of adverse conditions when attempting to leave, or assist others in leaving, the affected area. A critical factor in navigating locations in emergency conditions can be a reduced visibility caused by obscurants such as smoke or other airborne particulate matter. In very low visibility conditions, individuals unfamiliar with the environment are reluctant to evacuate through an obscurant sufficiently dense to reduce visibility below ten meters. Individuals familiar with exit routes are able to evacuate through more dense obscurants, at around five meters of visibility. At lower visibility levels, however, the behavior of individuals changes, and more reliance is placed on their feeling their way forward, while crawling along walls, as opposed to relying on visual information. It will be appreciated that this can significantly slow progression through the obscured environment and may result in prolonged exposure to toxic gases.

Furthermore, fire-fighting (and other first responder applications) is an inherently dangerous task and the risks are increased in confined spaces, for example, within buildings and ships. The high density of personnel and material assets within buildings and onboard a ship combined with limited egress options increase the urgency to rapidly, effectively, and safely address fire events. One of the primary challenges for both human and automated fire-fighting is reduced visibility in smoke-filled environments.

SUMMARY OF THE INVENTION

In accordance with an aspect of the present invention, a system is provided for recognizing a human being behind a barrier using a radar image. A millimeter band radar assembly captures radar returns from a region of interest, at least a portion of which is separated from the millimeter band radar assembly by the barrier. A system control processes the radar returns to provide at least one radar image showing the amplitude of the radar return in each of a plurality of locations within the region of interest. The system control includes a sensitivity tuning component that adjusts a noise floor for the processed sensor data to provide an image of the at least one radar image tuned to maximize the visibility of the human being. A display provides the radar image to a user.

In accordance with another aspect of the present invention, a method is provided for identifying a human being through a barrier. Radar returns are captured at a millimeter band radar assembly from a region of interest, at least a portion of which is separated from the millimeter band radar assembly by the barrier. The radar returns are processed to provide at least one radar image showing the amplitude of the radar return in each of a plurality of locations within the region of interest. A noise floor for the processed sensor data is adjusted to provide an image of the at least one radar image tuned to maximize the visibility of the human being. The image tuned to maximize the visibility of the human being is displayed to a user at an associated display.

In accordance with an aspect of the present invention, a system is provided for recognizing a human being behind a barrier using a radar image. A millimeter band radar assembly captures radar returns from a region of interest, at least a portion of which is separated from the millimeter band radar assembly by the barrier. A system control processes the radar returns to provide at least one radar image showing the amplitude of the radar return in each of a plurality of locations within the region of interest. The system control includes a sensitivity tuning component that adjusts a noise floor for the processed sensor data to provide an image of the at least one radar image tuned to maximize the visibility of the human being and a pattern recognition classifier configured to determine, from the radar images, if a human being is present in the region of interest.

DETAILED DESCRIPTION

An imaging system is provided for identifying human beings through barriers. First responders have the dangerous task of responding to emergency situations in firefighting scenarios involving homes and offices. The importance of this radar is its ability to see through walls and into adjacent areas to provide the first responder with information to assess the status of a building fire, its occupants, and to supplement his thermal camera which is obstructed by the wall. For the firefighter looking into an adjacent room containing unknown objects including humans, the challenge is to recognize what is in that room, the configuration of the room, and potential escape routes. The system has already demonstrated the capability of seeing through walls consisting of sheetrock separated by two by four pieces of wood, allowing a user to evaluate the contents of an adjacent room and to display the existence of persons and furniture. As discussed below, the system can display a sensitivity-tuned image to a user to maximize the likelihood that a human shape will be located. Further, an automated pattern recognition system may be employed to provide enhanced analysis of the scene.

Figure 1:
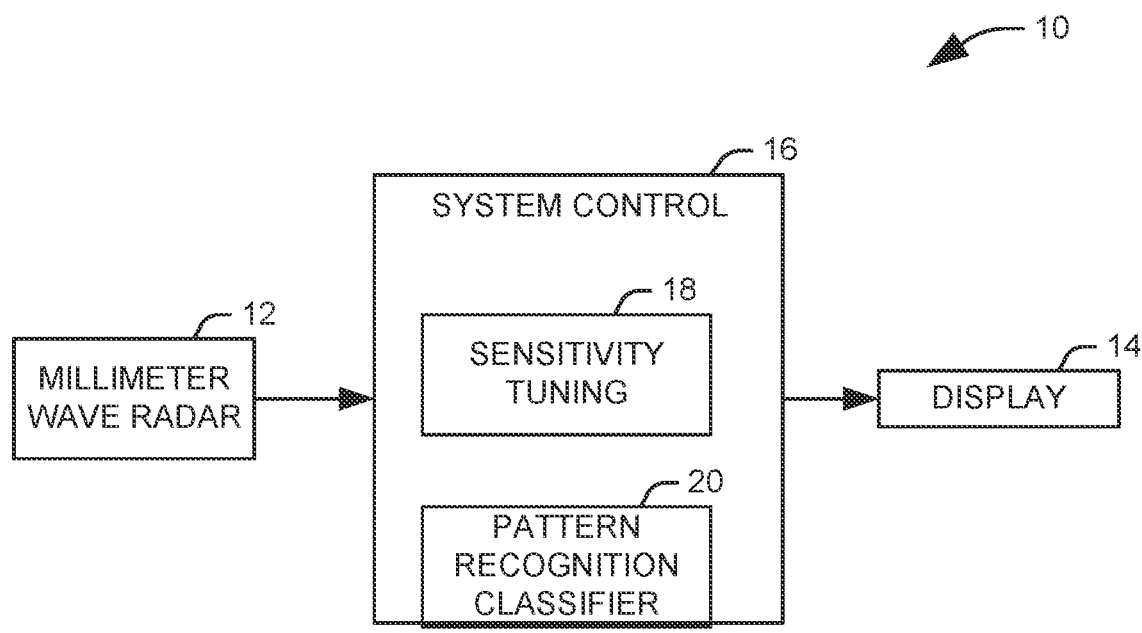
FIG. 1 illustrates an imaging system in accordance with an aspect of the present invention.

FIG. 1 illustrates an imaging system 10 in accordance with an aspect of the present invention. The system 10 includes a millimeter band radar assembly 12 configured to capture a radar image of the region of interest. The millimeter band radar assembly 12 combines the use of short range radar with a radiometer to image through barriers and to give the operator the necessary information, at an associated display 14, to identify human beings on the other side of the barrier. The system includes a system control 16 to process the raw radar images to provide radar images a color scale plot showing the amplitude of the radar return in each range-by-angle bin translated to x-y Cartesian coordinates. It will be appreciated that the system control 16 can include hardware elements, such as an analog-to-digital converter and various signal conditioning elements, for converting the radar returns into a form suitable for analysis, as well as machine executable instructions, stored on a non-transitory computer readable medium and executed by an associated processor, for creating an image at the display representing the radar returns. For example, the system control 16 can perform a two-dimensional Fast Fourier Transform (FFT) to transform the returns to range and Doppler values, extract the zero Doppler range bin data out to a specified range, apply a threshold to reduce noise, and convert the data to the Cartesian coordinates.

The inventor has determined that millimeter band radar, defined broadly herein as radar at frequencies between thirty gigahertz and three hundred gigahertz, can be used to identify human beings through barriers, such as the interior and exterior walls of a building. In one implementation, the millimeter band radar operates at a frequency between sixty-five gigahertz and ninety-four gigahertz, a frequency band that the inventor has determined to be particularly effective in imaging through smoke and dust and other obstructions to allow for use of this imaging system 10 for first responders. Another system designed by the inventor utilizing this property of millimeter band radar can be found in copending U.S. patent application Ser. No. 14/503,880, filed Oct. 1, 2014 and published as US 2015-0153449. The entire contents of this application are hereby incorporated by reference.

In one implementation, the millimeter band radar assembly 12 implements two dwell types, with long range and medium range coverage zones. The radar alternates between the two dwell types with a twenty-five millisecond update interval. The long range mode can provide an approximately fifty foot range. Key operating parameters, including horizontal field of view (FOV), range bin size and maximum range, are software controlled at the system control 16 and may be adapted via calibration. In one implementation, the long range mode can be used with a +/−18° field of view, and a 3.5° beam width. For the some applications, a shorter range, wider bandwidth mode with finer range bins may be appropriate.

The system 10 exploits on the ability of the millimeter band radar 12 to generate imaging data, illuminating a given region, such as a room, and any obstacles. The inventor has determined, however, that the relatively low resolution imaging of the millimeter band radar 12, the images provided to an operator at a display, without further enhancement, may not be sufficient to reliably identify a human being through arbitrary obstructions. For example, that the width and attenuating properties of barriers within and across environments can vary, so even a radar system that is carefully tuned for use on a particular barrier may provide suboptimal results when utilized on a different barrier.

To this end, the system control 16 can include a sensitivity tuning component 18 that adjusts a noise floor for the processed sensor data to provide at least one image tuned to maximize the visibility of the human being. By adjusting a noise floor, it is meant that a minimum signal-to-noise ratio for a return signal to be accepted is altered. It will be appreciated that the noise floor can be adjusted across multiple, predetermined values or to a value derived from the radar returns. For example, in one implementation, the noise floor can be set to a first value and a location (e.g., range-by-angle bin) having a highest magnitude return can be determined from the image. A second value for the noise floor can then be calculated from the first value for the noise floor and the highest magnitude return. In one implementation, the second value, $NF_2$, can be calculated as:

$$NF_2 = NF_1 - \frac{R_{Max}}{R_{Ref}} \Delta_{NF} \qquad \text{Eq. 1}$$

where $NF_1$ is the first value for the noise floor, measured in decibels, $R_{max}$ is the highest magnitude return, $R_{ref}$ is a reference value for the return, for example, a highest magnitude return expected for the radar system, and $\Delta_{NF}$ is a constant representing an expected decrease in the noise floor from a level at which an maximally reflective object would provide a maximum return to provide a recognizable image of a human in the same environment. In one implementation, this value is around ten decibels. It will be appreciated, however, that the value can be further weighted by the location, specifically the range, at which the return of maximum magnitude, $R_{Max}$, was obtained.

In another implementation, radar data for a region of interest can be processed at multiple noise floors to provide a plurality of images that are provided to a pattern recognition classifier 20. In one implementation, features can be extracted from each of the images and combined as part of a classification task. Example features can include return amplitudes at selected locations, average (e.g., mean or median) return amplitudes in selected regions of the image, maximum return amplitudes in the selected regions of the image, and largest lengths, widths, and areas of regions of contiguous locations having an amplitude above selected threshold values. Any or all of these features, taken from each of the images, can be combined into a feature vector for classifying the region of interest into one of a plurality of classes. In one implementation, the classification is binary, with "human present" and "human not present" classes, although it will be appreciated that additional classes could be included, for example, representing humans in different positions (e.g., standing, kneeling, sitting, and supine) or likelihoods that a human is present.

The pattern recognition classifier 20 can utilize one or more pattern recognition algorithms, each of which analyze the extracted features or a subset of the extracted features to determine if a human being is present in the region of interest and provide this information to the display 14. Where multiple classification algorithms are used, an arbitration element can be utilized to provide a coherent result from the plurality of classifiers. Each classifier is trained on a plurality of training images representing the classes of interest. The training process of the a given classifier will vary with its implementation, but the training generally involves a statistical aggregation of training data from a plurality of training images into one or more parameters associated with the output class. Any of a variety of optimization techniques can be utilized for the classification algorithm, including support vector machines, self-organized maps, fuzzy logic systems, data fusion processes, ensemble methods, rule based systems, or artificial neural networks.

For example, a support vector machine (SVM) classifier can process the training data to produce functions representing boundaries in a feature space defined by the various features. Similarly, an artificial neural network (ANN) classifier can process the training data to determine a set of interconnection weights corresponding to the interconnections between nodes in its associated the neural network.

A SVM classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, an output class and an associated confidence value can be determined for a given input feature vector according to its position in feature space relative to the boundaries. A rule-based classifier applies a set of logical rules to the extracted features to select an output class. Generally, the rules are applied in order, with the logical result at each step influencing the analysis at later steps. A regression model can be configured to calculate a parameter representing a likelihood that the region of interest contains a human being based on a set of predetermined weights applied to the elements of the feature vector.

An ANN classifier comprises a plurality of nodes having a plurality of interconnections. The values from the feature vector are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to a transfer function at the node. For example, the intermediate node can sum the received values and subject the sum to a binary step function. A final layer of nodes provides the confidence values for the output classes of the ANN, with each node having an associated value representing a confidence for one of the associated output classes of the classifier. In a binary classification, for example, in determining if a human being is or is not present in the region of interest, the final layer of nodes can include only a single node, which can be translated to a confidence value that a human being is present.

In still another implementation, the pattern recognition classifier 20 could a template matching algorithm could be used to recognize the human being within the plurality of images. To this end, a windowing algorithm can be used to locate and segment regions of contiguous locations within the radar image having a return value over a threshold amplitude. Each of these regions can then be compared to each a plurality of templates, representing a human shape in different positions (e.g., seated, kneeling, standing, supine) and orientations to provide a fitness metric representing the similarity of the template to the outline of the region. To facilitate this analysis, each template can be scaled to an evaluated region, and. When the fitness metric exceeds a threshold value, a user can be altered that a human being is likely present at that location. In another implementation, an edge detection algorithm, for example, Canny edge detection, can be applied to the image in place of the windowing algorithm to detect candidates for classification. In such a case, the templates are applied to the outlines created by the detected edges.

Figure 2:
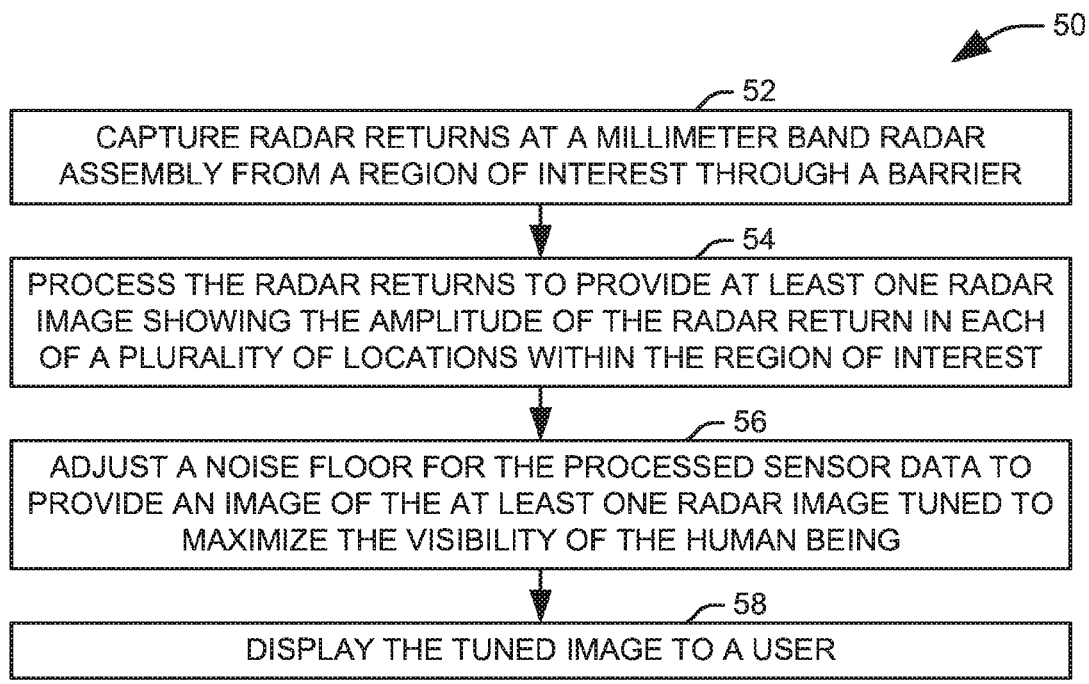
FIG. 2 illustrates a method for identifying a human being through a barrier from a radar image.
Figure 3:
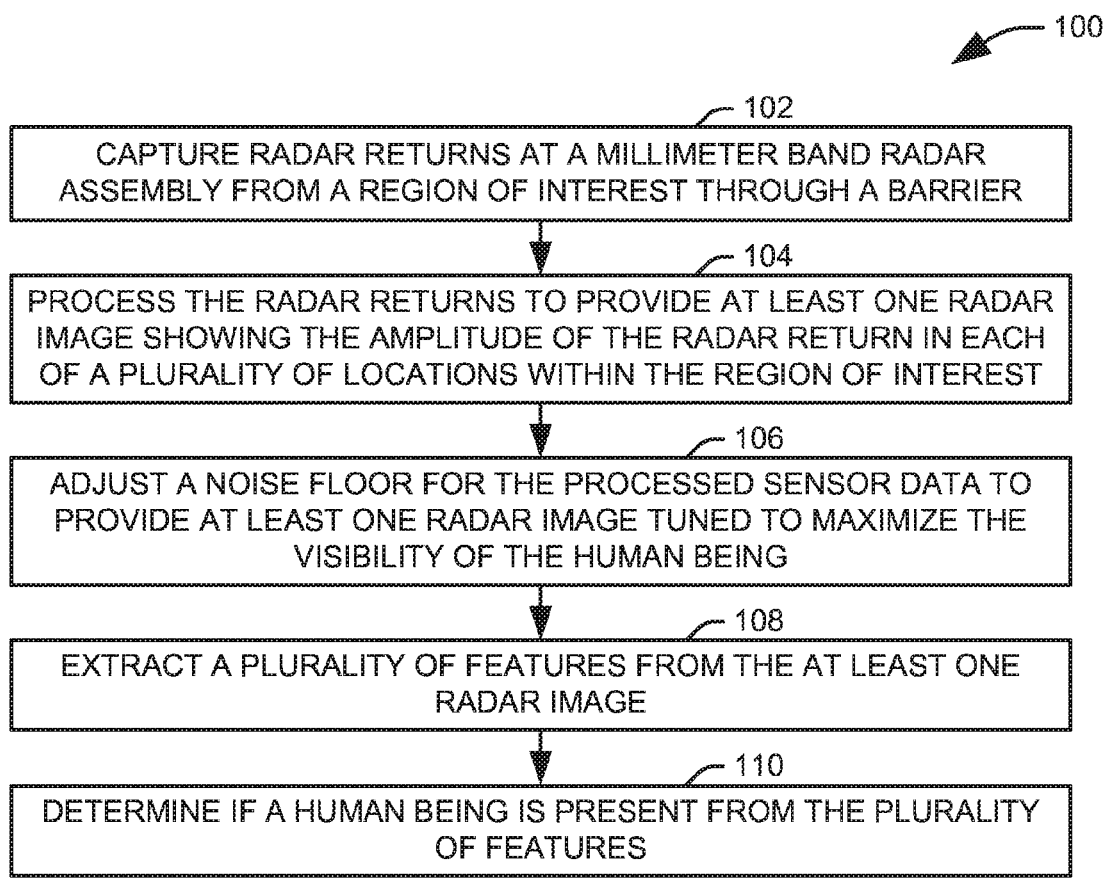
FIG. 3 illustrates one example of a method for identifying a human being through a barrier.
Figure 4:
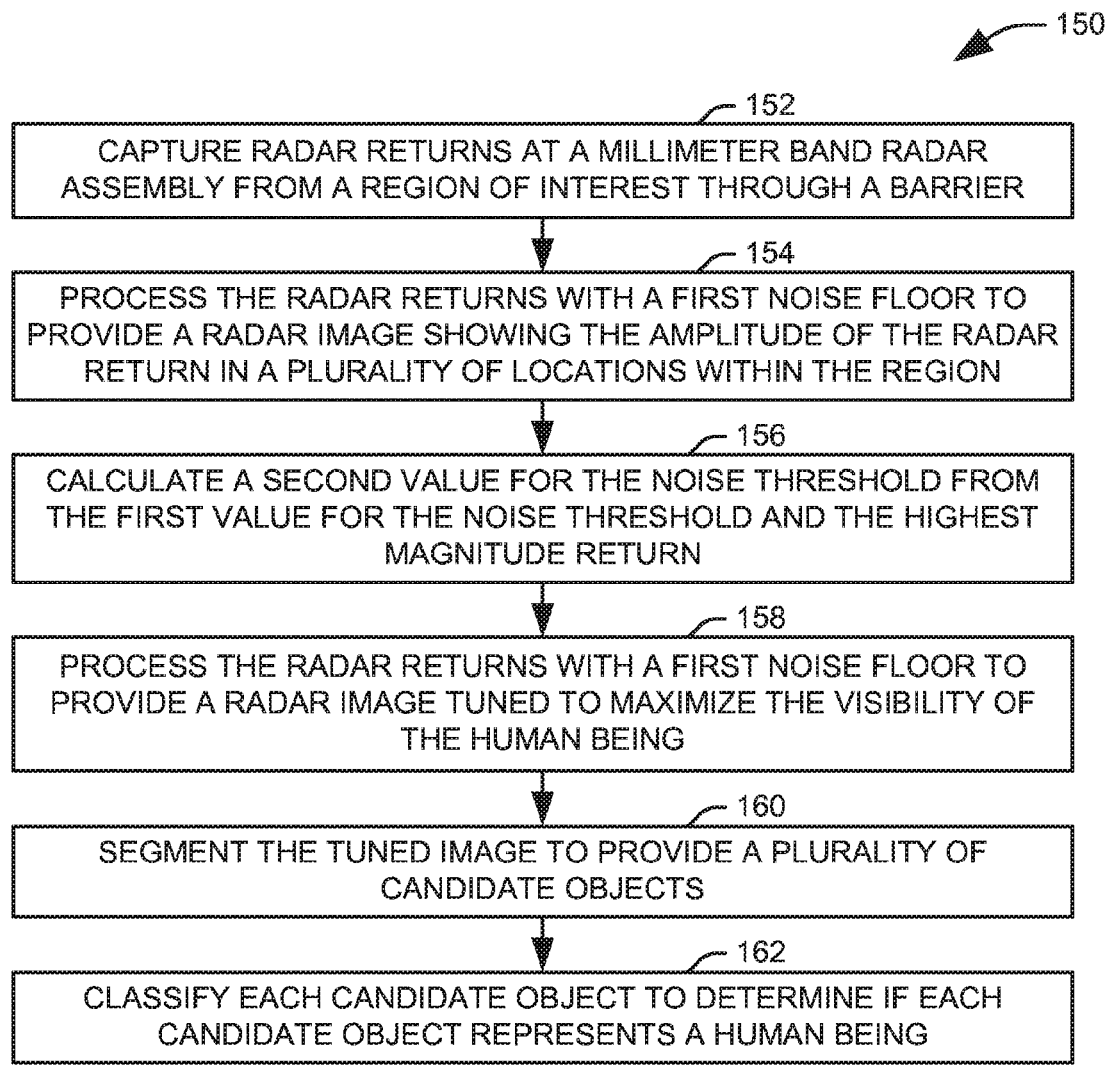
FIG. 4 illustrates another example of a method for identifying a human being through a barrier.

In view of the foregoing structural and functional features described above, example methods will be better appreciated with reference to FIGS. 2-4. While, for purposes of simplicity of explanation, the method of FIGS. 2-4 are shown and described as executing serially, it is to be understood and appreciated that the present invention is not limited by the illustrated order, as some actions could, in other examples, occur in different orders from that shown and described herein or could occur concurrently. It will be appreciated that some or all of each of these methods can be implemented as machine-readable instructions on a non-transitory computer readable medium.

FIG. 2 illustrates a method 50 for identifying a human being through a barrier. At 52, radar returns are captured at a millimeter band radar assembly from a region of interest. At least a portion of the region of interest is separated from the millimeter band radar assembly by the barrier. At 54, the radar returns are processed to provide at least one radar image showing the amplitude of the radar return in each of a plurality of locations within the region of interest. At 56, a noise floor for the processed sensor data is adjusted to provide an image of the at least one radar image tuned to maximize the visibility of the human being. It will be appreciated that the noise floor can be adjusted through a plurality of predetermined values or an optimal value can be calculated from the radar returns. At 58, the image tuned to maximize the visibility of the human being is displayed to a user at an associated display.

FIG. 3 illustrates one example of a method 100 for identifying a human being through a barrier. At 102, radar returns are captured at a millimeter band radar assembly from a region of interest. At least a portion of the region of interest is separated from the millimeter band radar assembly by the barrier. At 104, the radar returns are processed to provide at least one radar image showing the amplitude of the radar return in each of a plurality of locations within the region of interest. At 106, a noise floor for the processed sensor data is adjusted to provide at least one radar image tuned to maximize the visibility of the human being. In one implementation, the at least one image includes a plurality of images, each processed with a different noise floor.

At 108, a plurality of features are extracted from the at least one radar image. Where multiple images are used with varying noise floors, the features can be extracted across all of the images, such that the plurality of features includes at least one feature from each image. Example features can include return amplitudes at selected locations, average return amplitudes in selected regions of the image, maximum return amplitudes in the selected regions of the image, and dimensions of regions of contiguous locations having an amplitude above selected threshold values. At 110, is determined if a human being is present in the region of interest from the plurality of features at a pattern recognition classifier. This information, along with at least one of the processed images, can be provided to a user at an associated display.

FIG. 4 illustrates another example of a method 150 for identifying a human being through a barrier. At 152, radar returns are captured at a millimeter band radar assembly from a region of interest. At least a portion of the region of interest is separated from the millimeter band radar assembly by the barrier. At 154, the radar returns are processed with a first noise floor to provide a radar image showing the amplitude of the radar return in each of a plurality of locations within the region of interest. At 156, a second value for the noise floor is calculated from the first value for the noise floor and the highest magnitude return. At 158, the radar returns are processed using the second value for the noise floor to produce an image tuned to maximize the visibility of the human being.

At 160, the tuned image is segmented to provide a plurality of candidate objects. In one implantation, the segmentation is performed by applying an edge detection algorithm to the tuned image to locate outlines of candidate objects. In another implementation, a windowing algorithm is applied to locate and segment regions of contiguous locations within the radar image having a return value over a threshold amplitude. At 162, each candidate object is classified at an associated pattern recognition classifier to determine if each candidate object represents a human being. In one implementation, the classification includes comparing each candidate object to a plurality of templates, representing a human shape in different positions, to provide, for each candidate object, a plurality of fitness metrics. Each fitness metric represents the similarity of a given template to the candidate object. A candidate object is determined to be a human being if the fitness metric associated with any of the plurality of templates meets a threshold value.

Figure 5:
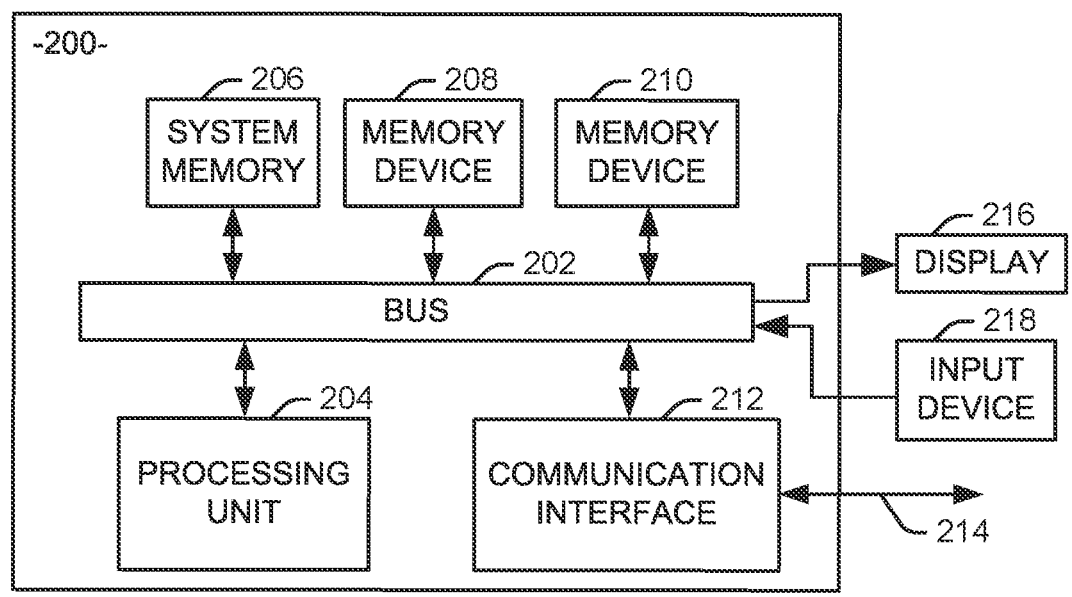
FIG. 5 is a schematic block diagram illustrating an exemplary system of hardware components.

FIG. 5 is a schematic block diagram illustrating an exemplary system 200 of hardware components capable of implementing examples of the systems and methods disclosed herein, such as the imaging system described previously. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard, touch screen, and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208, and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of an imaging system in accordance with the present invention, in particular, the system control 16, the sensitivity tuning component 18, and the pattern recognition classifier 20. Computer executable logic for implementing the imaging system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution. This medium may be distributed across multiple discrete assemblies all operatively connected to a common processor or set of related processors.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system for recognizing a human being behind a barrier using a radar image comprising:
   a millimeter band radar assembly that captures radar returns from a region of interest, at least a portion of which is separated from the millimeter band radar assembly by the barrier;
   a system control that processes the radar returns with a first noise floor to provide a first radar image showing an amplitude of the radar return in each of a plurality of locations within the region of interest, the system control including a sensitivity tuning component that calculates a second noise floor from the first radar image, the system control processing the radar returns with the second noise floor to provide a second radar image that is tuned to maximize visibility of the human being; and
   a display to provide the second radar image to a user.

2. The system of claim 1, the system control comprising a pattern recognition classifier configured to determine, from at least the second radar image, if a human being is present in the region of interest.

3. The system of claim 2, the pattern recognition classifier extracting a plurality of features from the second radar image and determining if a human being is present in the region of interest from the plurality of features.

4. The system of claim 3, the plurality of features including at least one feature from each of the first radar image and second radar image.

5. The system of claim 2, wherein the pattern recognition classifier applies a windowing algorithm to locate and segment regions of contiguous locations within the second radar image having a return value over a threshold amplitude and determines if each region of contiguous locations represents a human being.

6. The system of claim 5, wherein the pattern recognition component compares each region to a plurality of templates, representing a human shape in different positions, to provide, for each region, a plurality of fitness metrics, each representing a similarity of a given template to an outline of the region.

7. The system of claim 2, wherein the pattern recognition classifier applies an edge detection algorithm to locate outlines of candidate objects within the second radar image and determines if each candidate object represents a human being.

8. The system of claim 7, wherein the pattern recognition component compares each candidate object to a plurality of templates, representing a human shape in different positions, to provide, for each candidate object, a plurality of fitness metrics, each representing the similarity of a given template to the candidate object.

9. The system of claim 1, wherein the sensitivity tuning component determines a location of the plurality of locations within the first radar image having a highest magnitude return, and calculates a value for the second noise floor from the value for the first noise floor and the highest magnitude return.

10. A method for identifying a human being through a barrier, comprising:
    capturing radar returns at a millimeter band radar assembly from a region of interest, at least a portion of which is separated from the millimeter band radar assembly by the barrier;
    processing the radar returns with a first noise floor to provide a first radar image showing an amplitude of the radar return in each of a plurality of locations within the region of interest;
    calculating a second noise floor from the first radar image;
    processing the radar returns with the second noise floor to provide a second radar image tuned to maximize visibility of the human being; and
    displaying the second radar image to a user at an associated display.

11. The method of claim 10, wherein calculating the second noise floor comprises:
    determining a location of the plurality of locations having a highest magnitude return; and
    calculating a value for the second noise floor from the first noise floor and the highest magnitude return.

12. The method of claim 10, further comprising:
    segmenting the second radar image to provide a plurality of candidate objects; and
    classifying each candidate object at an associated pattern recognition classifier to determine if each candidate object represents a human being.

13. The method of claim 10, further comprising:
    extracting a plurality of features from the second radar image; and
    determining if a human being is present in the region of interest from the plurality of features at a pattern recognition classifier.

14. The method of claim 13, the plurality of features including at least one feature from each of the first radar image and the second radar image.

15. The method of claim 10, further comprising:
    segmenting the second radar image to provide a plurality of candidate objects; and
    classifying each candidate object at an associated pattern recognition classifier to determine if each candidate object represents a human being.

16. The method of claim 15, wherein classifying each candidate object comprises:
    comparing each candidate object to a plurality of templates, representing a human shape in different positions, to provide, for each candidate object, a plurality of fitness metrics, each representing the similarity of a given template to the candidate object; and
    determining that a candidate object is a human being if the fitness metric associated with any of the plurality of templates meets a threshold value.

* * * * *